United States Patent [19]
Walsh

[11] Patent Number: 5,982,397
[45] Date of Patent: Nov. 9, 1999

[54] VIDEO GRAPHICS CONTROLLER HAVING LOCKED AND UNLOCKED MODES OF OPERATION

[75] Inventor: Christopher Walsh, Arlington, Mass.

[73] Assignee: Philips Electronics North America Corporation, New York, N.Y.

[21] Appl. No.: 08/970,886

[22] Filed: Nov. 14, 1997

[51] Int. Cl.$^6$ .................................................. G09G 5/00
[52] U.S. Cl. ...................... 345/521; 345/132; 345/507; 711/219
[58] Field of Search ................................. 345/521, 520, 345/193, 514, 214, 513, 515, 132, 507; 395/115, 116, 726; 711/219, 220

[56] References Cited

U.S. PATENT DOCUMENTS

| | | | |
|---|---|---|---|
| 4,454,507 | 6/1984 | Srinivasan et al. | 340/744 |
| 4,546,451 | 10/1985 | Bruce | 364/900 |
| 4,706,074 | 11/1987 | Muhich et al. | 340/709 |
| 5,097,442 | 3/1992 | Ward et al. | 365/78 |
| 5,379,399 | 1/1995 | Conway-Jones et al. | 395/425 |
| 5,471,583 | 11/1995 | Au et al. | 395/250 |
| 5,473,756 | 12/1995 | Traylor | 395/250 |

FOREIGN PATENT DOCUMENTS

0768600A1  4/1997  European Pat. Off. .

*Primary Examiner*—Lun-Yi Lao
*Assistant Examiner*—Jimmy Hai Nguyen
*Attorney, Agent, or Firm*—Steven R. Biren

[57] ABSTRACT

A video graphics controller (VGC) for communicating with a frame buffer memory and a display device includes a first-in, first-out (FIFO)-configured memory, a memory controller for communicating with the frame buffer memory and controlling the FIFO-configured memory, and read and write pointers for the FIFO-configured memory. A subtractor is coupled to the read and write pointers for generating a difference signal which is coupled to the memory controller, and the read pointer generates a read carrier signal which is provided to a lock detector along with an end-of-frame signal. The lock detector generates an output signal which is coupled to the memory controller in order to place the video graphics controller in a locked mode of operation if no read carry signal is generated during an inputting of an entire frame of information into the FIFO-configured memory, and in an unlocked mode of operation if a read carry signal is generated prior to the completion of the inputting of an entire frame of information.

3 Claims, 3 Drawing Sheets

VIDEO GRAPHICS CONTROLLER HAVING LOCKED AND UNLOCKED MODES OF OPERATION

BACKGROUND OF THE INVENTION

The invention is in the field of digital data systems, and relates more particularly to video graphic controllers for communicating with display devices.

Various FIFO buffer memories with read and write pointers, data wrapping and other underlying concepts used in the present invention are well known in the art. One example of such a FIFO buffer system is shown in U.S. Pat. No. 5,471,583, incorporated herein by reference in its entirety in order to explain many of the background concepts and components used in the present invention, in the interest of brevity. This reference, and other references such as U.S. Pat. No. 5,473,756, also directed to a FIFO buffer memory system, are directed to methods and apparatus for controlling such systems, and in particular for detecting full and/or empty states of the FIFO buffer in a more efficient manner in order to enhance speed of operation.

There exists, however, a particular situation in which the potential exists for a substantial improvement in prior-art video FIFO buffer performance. Video FIFO's, or screen-refresh FIFO's as they are sometimes referred to, are typically of very limited size and can hold only a fraction of an entire image. These FIFO's are constantly being filled from the memory side and emptied from the video output side. This can be seen in FIG. 1, which is an overview block diagram of a portion of a computer system. This figure shows the interconnection of a CPU 10, a memory system 12, peripherals such as a keyboard, mouse or printer 14 and a video graphics controller (VGC) 16 via an I/O chip set 19, a bridge chip set 21 and various associated lines and buses. With respect to the portion of the computer system relevant to the present invention, the video graphics controller 16 is coupled to a frame buffer memory (typically a DRAM) 18 and a display device 20 such as a CRT or flat-panel display. A digital video stream input is provided to the video graphics controller 16, as shown symbolically by the block 22 in FIG. 1. The FIFO memory is contained within the video graphics controller 16, as will be described in further detail hereinafter, and is filled from the frame buffer memory 18 and emptied to provide a signal for the display device 20.

Prior-art FIG. 2 shows a portion of the video graphics controller 16 in further detail. This figure shows, in overview form, a portion of the video graphics controller having an SRAM cache used as a FIFO memory and designated with the reference numeral 100. A memory controller 102 looks at the volume of the SRAM 100 by comparing the read and write pointers, 104 and 106, respectively, derived at the output of a subtractor 108, with the difference being applied to the memory controller 102. When the volume of the memory, as represented by the output of subtractor 108, reaches a level such that more information must be put in, the memory controller bursts enough information to fill the FIFO and then resumes its other tasks. Meanwhile, the display device 20 is being refresh by a slow drain of data from the FIFO, with the read pointer being incremented for every piece of data used, and with the incrementing of the pointers being shown symbolically by the blocks labeled +1 in FIG. 2. When the read pointer equals the write pointer, the FIFO is empty. Since the system as so far described is known in the prior art, and is similar in general configuration to that shown in U.S. Pat. No. 5,471,583, it will not be described in further detail herein.

As noted above, video FIFO's are typically very limited in size, and are constantly being filled from the memory side and emptied from the video output side. However, under certain conditions, such as when an image can fit entirely within the video FIFO memory, where there is no need to keep filling the FIFO from the memory side unless the image to be displayed has been altered. An example of such a situation occurs with a typical mouse cursor, wherein the SRAM FIFO memory capacity is large enough to hold the entire image, and wherein there are times during which the image remains static.

Since the frame buffer DRAM 18 has substantially greater capacity than that needed to hold the cursor image, and since the path between the frame buffer 18 and the video graphics controller 16 is typically single ported (i.e., only one read or write operation to a single location may take place at any point in time) this portion of the system must have a greater bandwidth than that required by the display refresh stream alone, and the path must be time-multiplexed. The relatively small memory array in the video graphics controller is used to equalize the fast periodic burst of data from the frame buffer memory and is typically configured as an SRAM (100) organized as a circular buffer and used as a FIFO. Under these conditions, system performance could be substantially improved by reducing the bandwidth required to refresh the display under proper circumstances, such as the presence of a small, frequently unchanging image such as that of a mouse cursor.

SUMMARY OF THE INVENTION

It is therefore an object of the invention to provide a video graphics controller which is capable of operating in a conventional, unlocked mode for large and/or frequently changing images, and in a locked mode for images that can entirely fit within the FIFO memory and which are static. It is a further object of the invention to provide a video graphics controller which increases system performance by reducing the bandwidth required to refresh the display under appropriate conditions.

In accordance with the invention, these objects are achieved in a video graphics controller of the type described above in which the read pointer generates a read carry signal, a lock detector is provided for receiving the read carry signal and end-of-frame signal and for generating an output signal coupled to the memory controller to place the video graphics controller in a locked mode of operation if no read carry signal is generated during an inputting of an entire frame of information into the FIFO-configured memory. If a read carry signal is generated prior to the completion of inputting an entire frame of information into the FIFO-configured memory, the video graphics controller is placed in a normal, unlocked mode of operation.

In a preferred embodiment of the invention, the read and write pointers wrap in the unlocked mode of operation, and the FIFO-configured memory operates as a write-once, read-many-times memory in the locked mode of operation.

Video graphics controllers in accordance with the present invention, which are capable of operating in either a locked or unlocked state depending upon image requirements, offer the advantage of improved system performance by reducing the bandwidth required to refresh the display when a small and frequently static image, such as mouse cursor, is being displayed.

These and other aspects of the invention will be apparent from and elucidated with reference to the embodiments described hereinafter.

BRIEF DESCRIPTION OF THE DRAWING

The invention may be more clearly understood with reference to the following description, to be read in conjunction with the accompanying drawing, in which.

In the figures, like elements are generally provided with like reference numerals for ease in identification.

DESCRIPTION OF THE PREFERRED EMBODIMENTS

Figure 1:
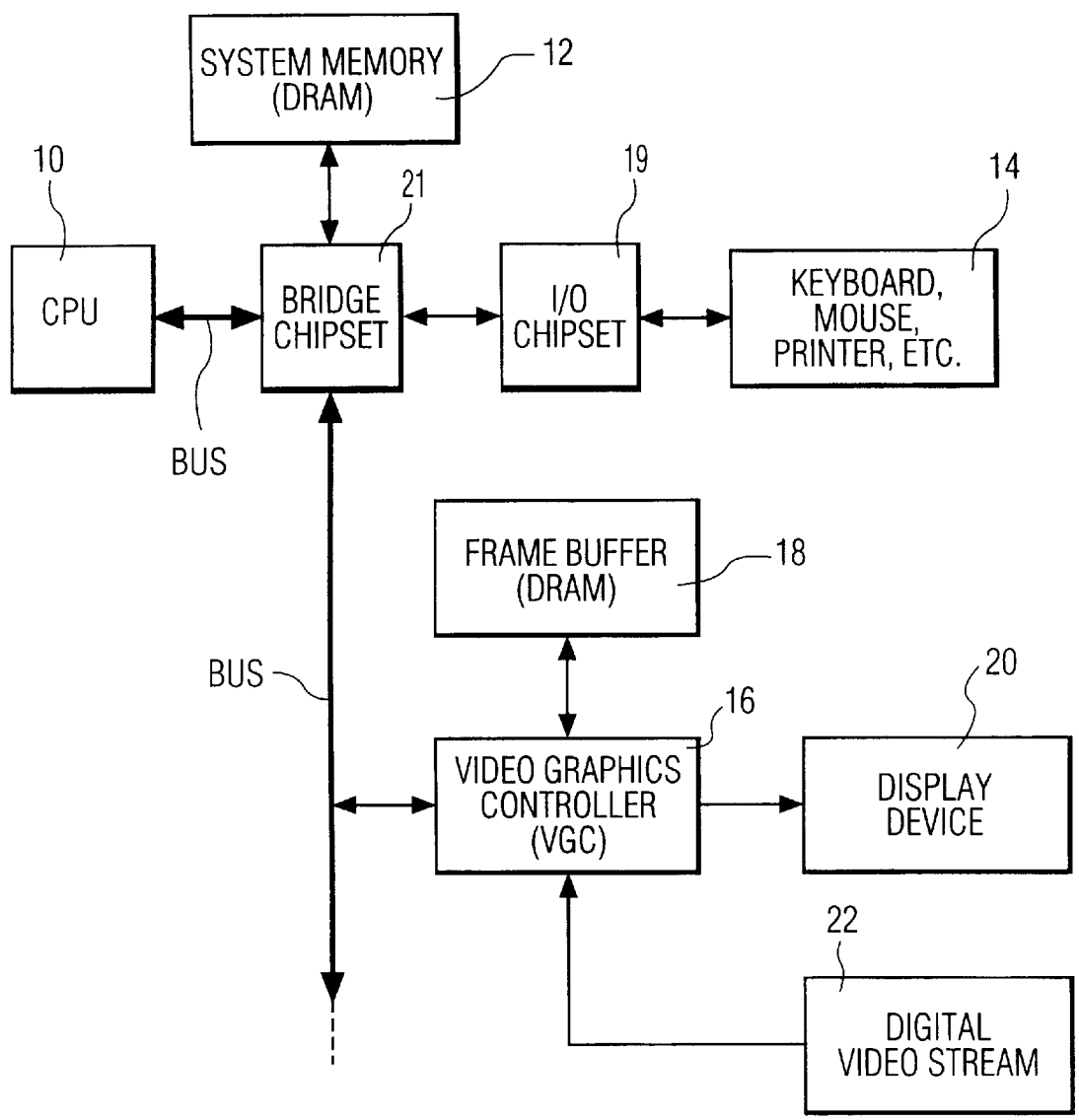
FIG. 1 shows, in simplified block-diagram form, a portion of a prior-art computer system having a video graphics controller.
Figure 2:
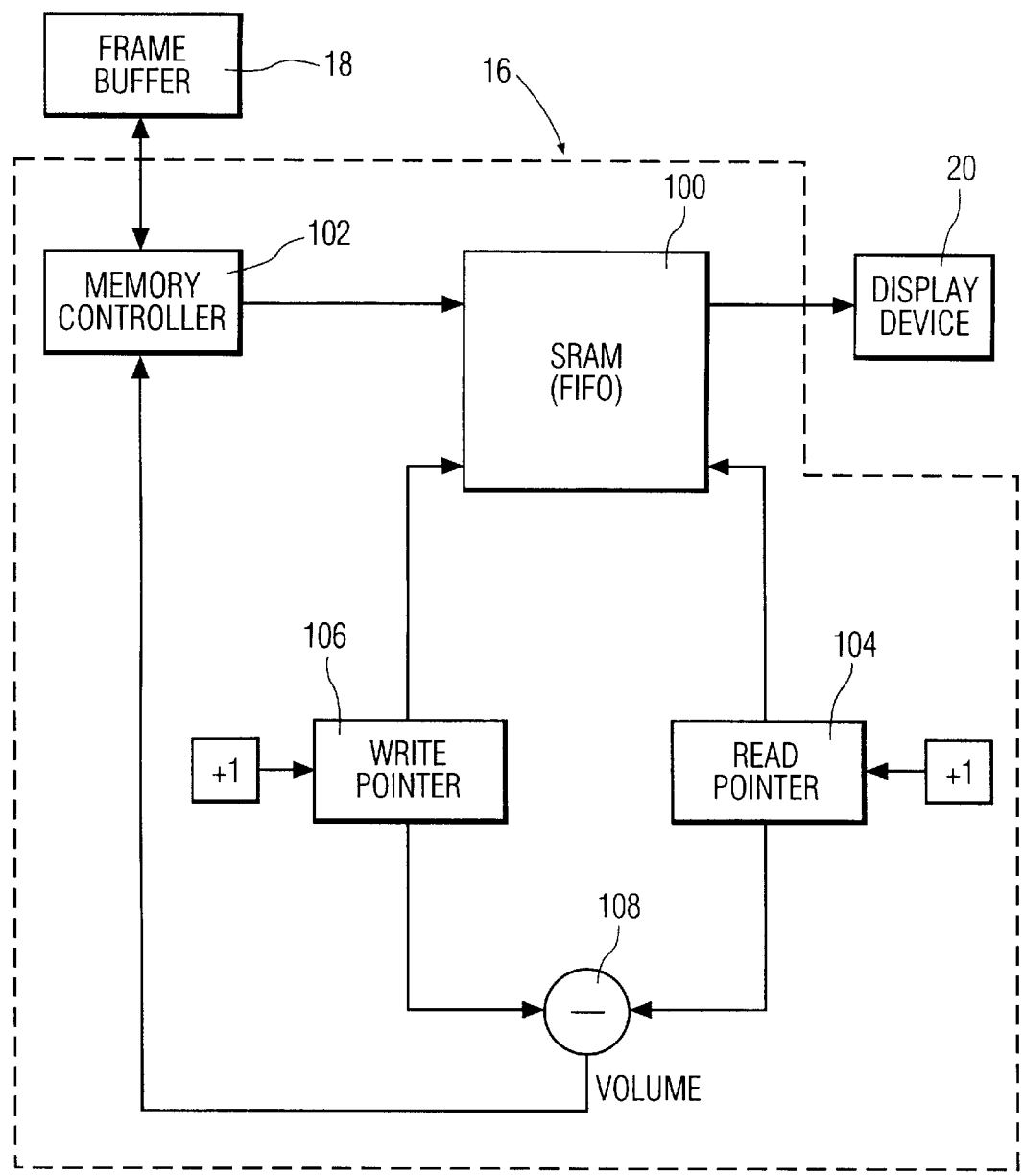
FIG. 2 shows a block diagram of a portion of a prior-art video graphics controller.
Figure 3:
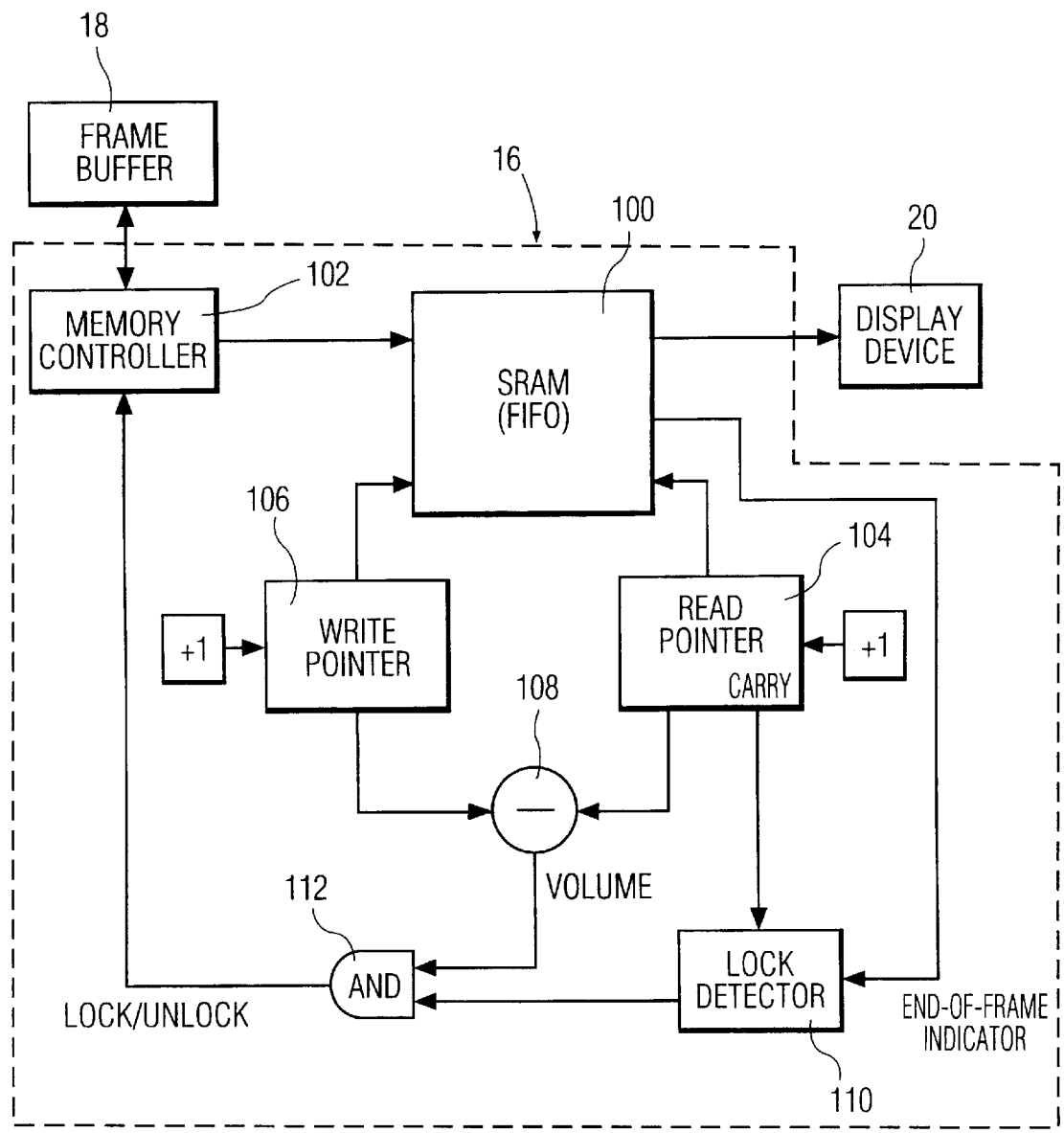
FIG. 3 shows a portion of a video graphics controller in accordance with the invention.

A video graphics controller 16 in accordance with the invention is shown in simplified form for purposes of illustration in FIG. 3. As in FIG. 2, the video graphics controller has a memory controller 102 which communicates with a frame buffer 18, and the output of FIFO-configured memory 100 is provided to a display device 20. Also in common with FIG. 2, FIG. 3 shows incremented read and write pointers 104 and 106, respectively, which have their outputs coupled to a subtractor 108, the output of which provides an indication of memory volume.

In accordance with the invention, the video graphics controller of FIG. 3 additionally includes a lock detector 110 which receives a read carry signal from the read pointer 104 and an end-of-frame indicator signal from the FIFO-configured memory 100. The output of lock detector 110 is provided to one input of an AND-gate 112, the other input of which is provided by the output of subtractor 108 which is an indication of the FIFO memory volume. The system shown in FIG. 3 is completed by a connection from the output of AND-gate 112 to the memory controller 102, in order to provide a lock/unlock control signal to the memory controller and thereby set the FIFO-configured memory in either a locked or unlocked mode of operation.

It will be recognized that the present invention is based upon the broad concept that if an image, such as a mouse cursor, can fit entirely within the limited capacity of a video FIFO, there is no need to keep filling the FIFO from the memory side, as was the case in the prior art, unless the source image has been altered. In the present invention, this is accomplished by operating the video graphics controller in either a conventional, unlocked mode, or, when an image can fit entirely within the FIFO memory and is static, operating the video controller in a locked mode of operation to prevent unnecessary memory access from occurring and thereby providing increased memory bandwidth for other devices within the video graphics controller. In this regard, FIG. 3 shows a particular implementation of a system to accomplish this result, in which it will be recognized that the individual circuit blocks can be implemented in various different ways as will be apparent to those of ordinary skill in the art, and that other implementations can be used to achieve the desired result once the concepts of the present invention are understood.

In accordance with the invention, in the embodiment shown in FIG. 3 the lock detector 110 determines whether or not the amount of data needed to fill a frame will fit inside the FIFO memory. This is accomplished by coupling the lock detector to a carry from the read pointer 104, so that if, by the time one entire frame has been refreshed, the read pointer has not wrapped and no carry signal has been generated, then a condition exists in which the entire frame will fit within the FIFO. If, on the other hand, the read pointer does wrap during the frame and a carry signal is generated, then the entire frame does not fit within the FIFO, and the video graphics controller can not be locked as in the case when the entire image fits within the FIFO. In the case where the entire frame fits within the FIFO, the read pointer will not wrap during the frame and no carry signal will be generated. This will cause the lock detector to provide a signal to AND gate 112 to place the system into a locked state, thus avoiding the necessity of rewriting a static image and thereby freeing up memory bandwidth for other uses until such a time as a changed image in the frame buffer 18 occurs. When such a change occurs, the new image will be reloaded into the FIFO memory 100, with the system in an unlocked state, and then the system will revert to its locked mode of operation until the source image once again changes.

In this manner, the present invention provides an improved video graphics controller which operates in either a locked or unlocked state and thereby increases system performance by reducing the bandwidth required to refresh the display when the display is static.

While the invention has been particularly shown and described with reference to a preferred embodiment thereof, it will be understood by those skilled in the art that various changes in form and detail may be made without departing from the spirit or scope of the invention.

What is claimed is:

1. A video graphics controller (VGC) for communicating with a frame buffer memory and a display device, comprising a first-in, first-out (FIFO)-configured memory, a memory controller for communicating with said frame buffer memory and for controlling said FIFO-configured memory, read and write pointers for said FIFO-configured memory, and a subtractor coupled to said read and write pointers for generating a difference signal which is coupled to said memory controller, characterized in that said read pointer generates a read carry signal, a lock detector is provided for receiving said read carry signal and an end-of-frame signal and for generating an output signal coupled to said memory controller to place said video graphics controller in a locked mode of operation if no read carry signal is generated during an inputting of an entire frame of information into said FIFO-configured memory, and in an unlocked mode of operation if a read carry signal is generated prior to the completion of said inputting of an entire frame of information.

2. A video graphics controller (VGC) for communicating with a frame buffer memory and a display device as in claim 1, wherein said read and write pointers for said FIFO-configured memory wrap in said unlocked mode operation, and said FIFO-configured memory operates as a write-once, read-many-times memory in said locked mode of operation.

3. A video graphics controller (VGC) for communicating with a frame buffer memory and a display device as in claim 1, wherein the output signal of said lock detector and said difference signal are coupled to said memory controller through an AND gate.

* * * * *